United States Patent [19]

Slater

[11] 4,443,861

[45] Apr. 17, 1984

[54] COMBINED MODE SUPERVISORY PROGRAM-PANEL CONTROLLER METHOD AND APPARATUS FOR A PROCESS CONTROL SYSTEM

[75] Inventor: Billy R. Slater, Plano, Tex.

[73] Assignee: Forney Engineering Company, Addison, Tex.

[21] Appl. No.: 253,964

[22] Filed: Apr. 13, 1981

[51] Int. Cl.³ .............................................. G06F 15/46
[52] U.S. Cl. ..................................... 364/900; 364/138; 364/189; 364/492
[58] Field of Search ............... 364/138, 188, 189, 492, 364/200 MS File, 900 MS File

[56] References Cited

U.S. PATENT DOCUMENTS

| | | | |
|---|---|---|---|
| 3,699,529 | 10/1972 | Beyers et al. | 340/172.5 |
| 3,971,000 | 7/1976 | Cromwell | 364/138 X |
| 3,975,622 | 8/1976 | Horn et al. | 340/172.5 |
| 4,064,394 | 12/1977 | Allen | 364/189 |
| 4,303,973 | 12/1981 | Williamson, Jr. et al. | 364/189 X |

OTHER PUBLICATIONS

Technical Information Bulletin TI 8-130003 entitled "Foxboro Control Package" believed to have been published in 1977.

Primary Examiner—Raulfe B. Zache
Attorney, Agent, or Firm—Marvin A. Naigur; John E. Wilson; Richard L. Aitken

[57] ABSTRACT

A combined mode program-panel controller method for a distributed industrial process control system permits a system operator to configure the overall system architecture to control the sequential operation of the entire system or a sub-portion thereof. The program-panel controller includes a first user accessible graphic program by which the system architecture can be symbolically reconfigured and a second user accessible instruction set program by which the operating parameters of the so-configured system or a sub-portion thereof may be altered.

5 Claims, 27 Drawing Figures

BLOCK
BLOCK TYPE ?
INPUT 1 ?
INPUT 2 ?
INPUT 3 ?
COMPLETE

FIG. 24a.

BLOCK 1
BLOCK TYPE ? LOSEL
INPUT 1 ? 1000 TPH
INPUT 2 ? C20
INPUT 3 ? 1
COMPLETE

COMBINED MODE SUPERVISORY PROGRAM-PANEL CONTROLLER METHOD AND APPARATUS FOR A PROCESS CONTROL SYSTEM

CROSS REFERENCE TO RELATED APPLICATIONS

The subject matter of the present application is related to the subject matter disclosed in co-pending U.S. patent application Ser. No. 115,160 by B. Slater and Ser. No. 115,161 by M. Cope, both filed on Jan. 24, 1980 and entitled, "Industrial Control System"; Ser. No. 154,597 filed on June 16, 1980 by C. Paredes and B. Slater and entitled, "Industrial Control System"; Ser. No. 202,472 filed on Oct. 31, 1980 by M. Cope and entitled, "Status Change Logging in Industrial Process Control Systems;" and Ser. No. 202,471 filed on Oct. 31, 1980 by M. Cope and entitled "Automatic Line Termination." The subject matter of these applications is incorporated herein to the extent necessary to practice the present invention.

BACKGROUND OF THE INVENTION

The present invention relates to an industrial control system and, more particularly, to a method of controlling an industrial control system from which the overall system architecture and the operating parameters thereof may be conveniently modified by the system operator.

Typical industrial control systems include a plurality of diverse controlled devices and associated sensors that are interconnected and operably inter-related to achieve the desired system function. An exemplary industrial control system is one that controls the overall operation of a coal-fired electrical power generation installation. The controlled devices typically utilized in this type of application include motors, transmissions, valves, solenoids, pumps, compressors, clutches, etc., and the associated sensors typically include electrical energy responsive sensors, motion detectors, temperature and pressure detectors, timers, and the like. The controlled devices and the associated sensors are typically combined to form higher level sub-systems such as fuel feed systems, burner control systems, and pollution control and management sub-systems.

In the past, coordinated control of the various devices has been achieved by manually operated and various types of semi-automatic and automatic control systems including electromagnetic relay systems, hard-wired solid state logic systems, and various types of computer control systems. The computer systems have included central systems in which the various sensors and controlled deivices are connected to a central computer; distributed control systems in which a remotely located computer is connected to each of the controlled devices and to one another; and hybrid combinations of the central and distributed systems.

In each application where the system is under computer control, software must be provided to effect the desired sequential operation of the computer and consequent operation of the system. In general, software is generated by specialists who create the program in accordance with the system performance requirements. As part of this software generation, it is necessary to effect trial runs of the system during which time the software is "debugged". Likewise, when it is necessary to alter or otherwise modify the system operation, the software must be modified and debugged. In general, the procedure for writing software and the consequent debugging is both time consuming and expensive.

In order to provide for flexible operation of computer controlled industrial control systems and convenient modification of that control, there is a need for means by which the control system operator can quite readily alter the system configuration as well as change the operating parameters for the system or a sub-system portion thereof without the need for extensive software modification.

SUMMARY OF THE INVENTION

Accordingly, it is an overall object of the present invention, among others, to provide a method by which control instructions for controlling system configuration and operating parameters can be readily developed.

It is another object of the present invention to provide a method by which changes in control instructions for the computer system can be readily accomplished in a time-efficient manner.

It is another object of the present invention to provide means for guiding the operator of the control system in such a manner that the operator can readily understand and reconfigure the control system.

In accordance with these objects and others, a combined-mode program panel display is provided for displaying graphic symbols representative of desired system functions with means by which the inter-relationship of the system function and various operating states and parameters may be established. The system operator, at the program panel, can effect system changes by having system function displayed in symbolic graphic form and then interconnect the symbolic forms to achieve new controlled device inter-relationships. In addition, the operating states and parameters of the so-configured controlled devices can likewise be displayed in alphanumeric form whereby the system operator, again at the combined-mode program panel, can effect and guide system operation in a time efficient manner.

The inventive method advantageously permits the system operator to quickly and efficiently configure or reconfigure control loop architecture at the system or sub-system level and establish parameters or operating states of the so-configured architecture.

BRIEF DESCRIPTION OF THE DRAWINGS

The above description as well as further objects, features, and advantages of the present invention will be more fully understood by reference to the following description of a presently preferred but nonetheless illustrative embodiment in accordance with the present invention, when taken in connection with the accompanying drawings wherein.

DESCRIPTION OF THE PREFERRED EMBODIMENT

Figure 1:
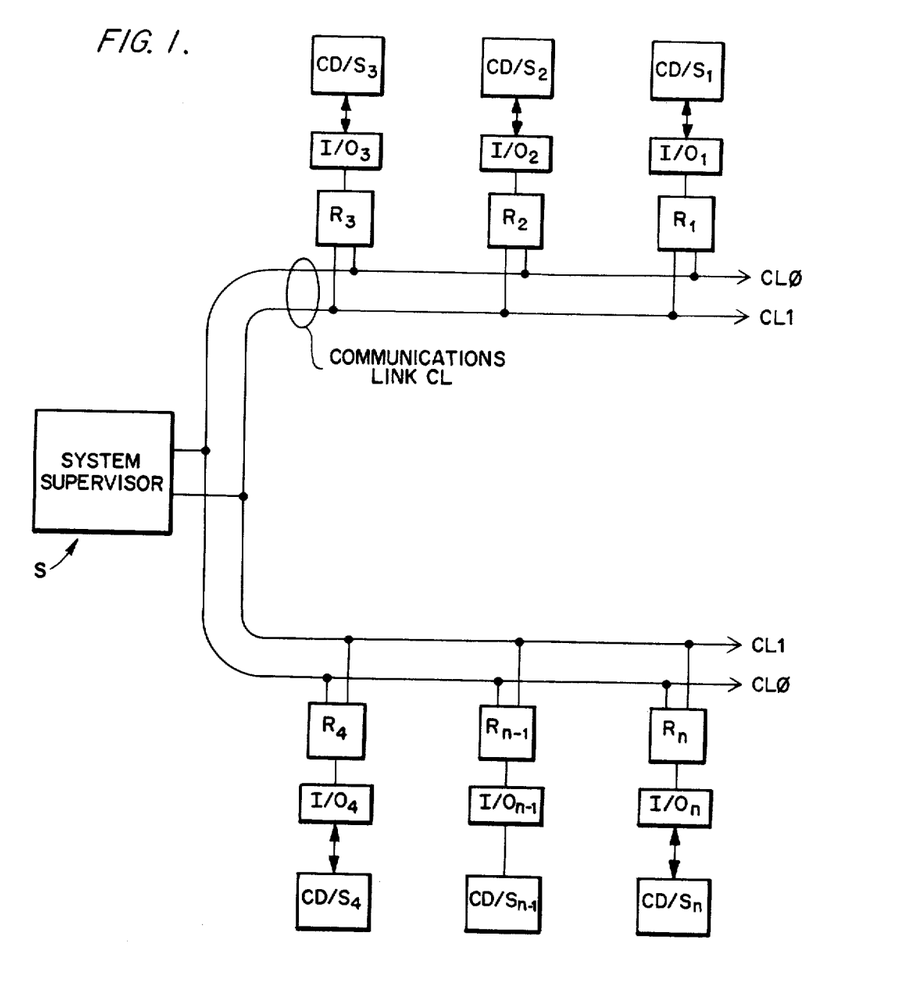
FIG. 1 is an overall system diagram of an industrial process control system in accordance with the present invention including a system supervisor to permit supervisory system control and a plurality of remotely located device controllers interconnected through a system communications link or buss.

A preferred embodiment of an industrial control system in accordance with the present invention is shown in FIG. 1 and, as shown therein, includes a plurality of remotely located device controllers $R_1, R_2, R_3 \ldots R_{n-1}, R_n$ each connected to one another through first and second communication links CL0 and CL1. A combined-mode system supervisor S is also connected to communication links CL0 and CL1 for the purpose, as described more fully below, of permitting convenient configuration or reconfiguration of the control architecture of the system and for the purpose of setting or alterating the operating parameters of the system. Each of the remotely located controllers $R_n$ is connected to an associated input/output interface $I/O_1, I/O_2, I/O_3, \ldots I/O_{n-1}$, and $I/O_n$ which, in turn, is connected to respective controlled devices and/or sensors $CD/S_1$, $CD/S_2, CD/S_3 \ldots CD/S_{n-1}$, and $CD/S_n$.

Figure 2:
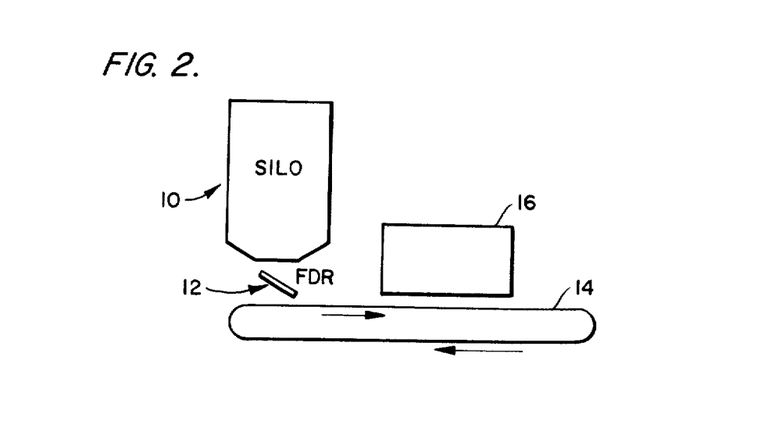
FIG. 2 is a diagrammatic representation of a crushed-coal feeder that may be controlled by the industrial control system of FIG. 1.

The system shown in FIG. 1 may be used for a wide variety of industrial process control applications including the exemplary application illustrated in FIG. 2 in which a flow of crushed fuel coal for a coal-fired steam generator (not shown) is controlled. The exemplary application includes a coal containing silo 10 that contains granulated coal and a feeder 12 located at the discharge port of the silo 10 for selectively controlling the rate of discharge of the coal from the silo 10 to a conveyor 14. The conveyed coal is delivered to the steam generator for subsequent combustion with the rate of flow measured by the belt scale 16. The system of FIG. 1 can be easily be configured to effect control of the coal flow by measuring the belt scale 16 output and comparing it with a predetermined high and/or low limits and controlling the feeder 12 in response to the scale output.

Figure 3:
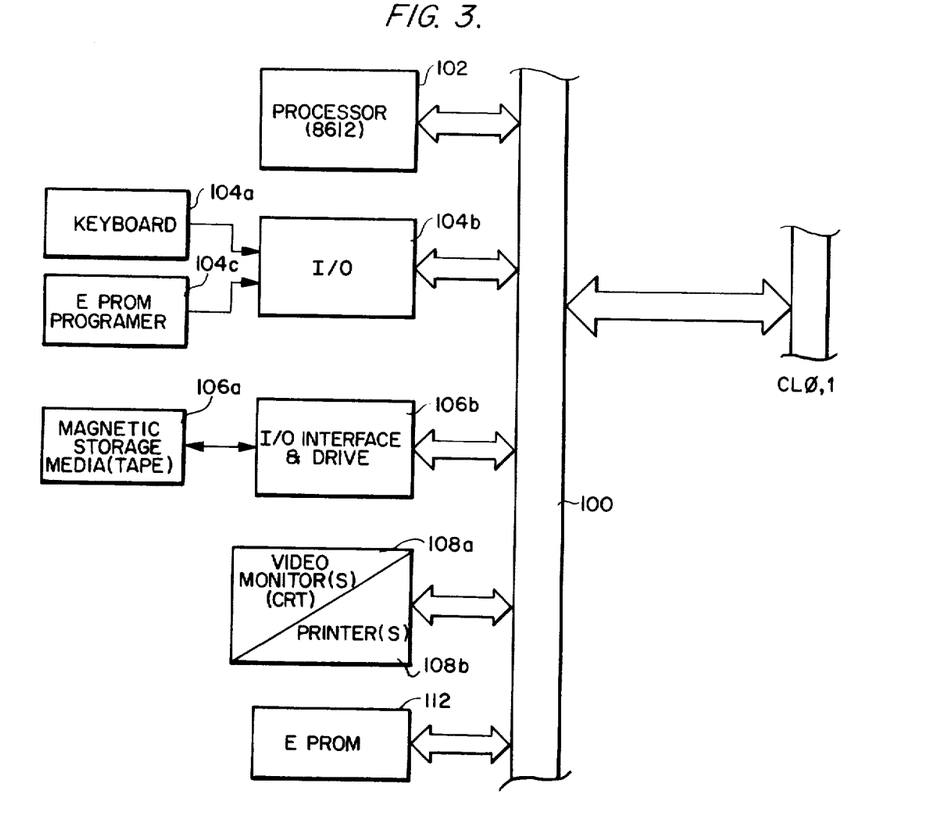
FIG. 3 is a schematic block diagram of the system supervisor functional block shown in FIG. 1.

The control configuration of the system of FIG. 1 to achieve control of the exemplary application of FIG. 2 is accomplished through the combined mode system supervisor S, a detailed view of the architecture of which is shown in FIG. 3. The system supervisor S includes a supervisor buss 100 that interconnects the various devices that constitute the supervisor. These devices include a processor 102; an input device in the form of a keyboard 104a, connected to the buss 100 through an input/output device 104b; an EPROM programmer 104c also connected through the input/output device 104b; a magnetic storage device 106a and an associated input/output and driver device 106b; an output device 108 which may include, for example, a video CRT screen 108 and printers 108b; and a memory 110 that serves the processor 102.

The EPROM 110 contains instruction sets provided thereto by the EPROM programmer 104c through the input/output device 104b. These instruction sets enable the system operator at the keyboard 104a, under the control of the processor 102, to effect the aforementioned changes in control system architecture and operating parameters. The magnetic media memory 106 provides temporary storage for operating data and other parameters while the output devices 108a and 108b provide output information for the system operator in user-recognizable form.

The instruction-sequence sets contained within the EPROM 112 provide two types of higher level user compatible control formats: instruction sets that develop block type symbolic representations for presentation to the system operator via the video output device 108a and alphanumeric type assembly language information also presented to the system operator on the video display 108a. Regardless of the mode of operation elected by the system operator, the operator, while at the keyboard 104a and viewing the video output device 108a can configure the system control architecture and establish the operating parameters.

The instruction set for the first type of instructions, that is, for providing video functional symbols, is adapted to provide visual images of the functional blocks so that the system operator can manipulate the inputs and outputs of the blocks and interconnect them to provide a desired system architecture, such as an architecture for effecting control of the application shown in FIG. 2.

The exemplary functional blocks developed by the instructions in the EPROM 104a for presentation and operation upon by the system controller are shown in FIGS. 4–24 with the function of each of these blocks described in the paragraphs below.

Figure 4:
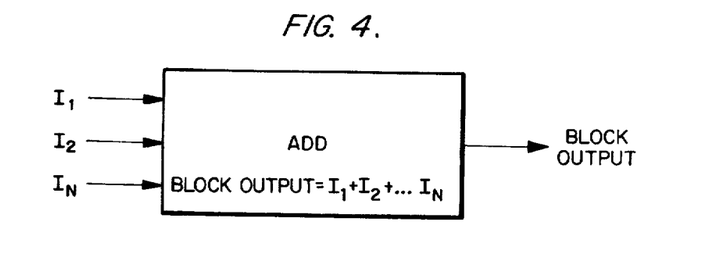
FIG. 4 is a schematic representation of an exemplary 'addition' functional block.

Function designation: ADD (FIG. 4)

This function symbol permits the system operator to obtain the sum of several inputs as follows:

$$\text{Block Output} = I_1 + I_2 + \ldots I_n$$

Figure 5:
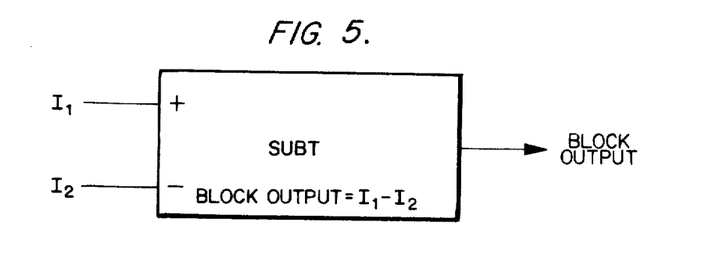
FIG. 5 is a schematic representation of an exemplary 'subtraction' functional block.

Where:
 $I_1$ = First Input Signal, Constant or Block
 $I_2$ = Second Input Signal, Constant or Block
 $I_n$ = Nth Input Signal, Constant or Block Function designation: SUBT (FIG. 5)

This function symbol permits the system operator to obtain an output which is equal to the difference between a first and second input in which the second input is substracted from the first input to form the output of the block as follows:

$$\text{Block Output} = I_1 - I_2$$

Figure 6:
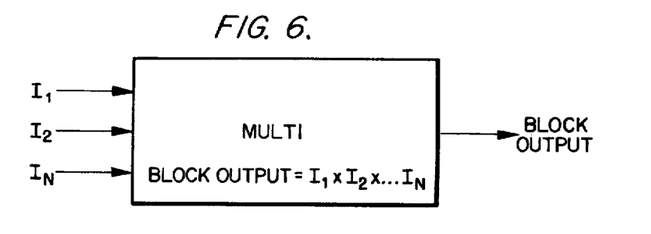
FIG. 6 is a schematic representation of an exemplary 'multiplication' functional block.

Where:
 $I_1$ = First Input Signal, Constant or Block
 $I_2$ = Second Input Signal, Constant or Block Function designation: MULTI (FIG. 6)

This function symbol permits the system operator to obtain an output which is the product of the multiplied inputs as follows:

$$\text{Block Output} = I_1 \times I_2 \times \ldots I_n$$

Figure 7:
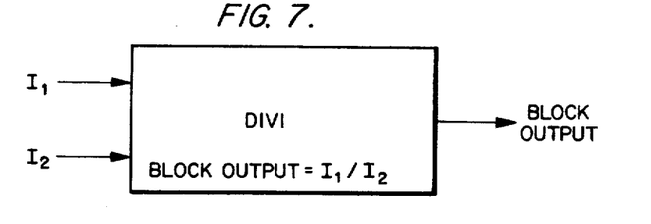
FIG. 7 is a schematic representation of an exemplary 'division' functional block.

Where:
 $I_1$ = First Input Signal, Constant or Block
 $I_2$ = Second Input Signal, Constant or Block
 $I_n$ = Nth Input Signal, Constant or Block Function designation: DIVI (FIG. 7)

This function symbol permits the system operator to obtain the dividend of a numerator and a denominator input as follows:

$$\text{Block Output} = I_1 / I_2$$

Figure 8:
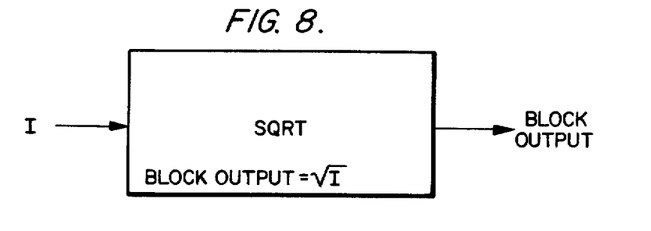
FIG. 8 is a schematic representation of an exemplary 'square root' functional block.

Where:
 $I_1$ = First Input Signal, Constant or Block
 $I_2$ = Second Input Signal, Constant or Block Function designation: SQRT (FIG. 8)

This function symbol permits the system operator to obtain the square root of a number as follows:

$$\text{Block Output} = \sqrt{I}$$

Where:
 $I$ = Input Signal, Constant or Block

Figure 9:
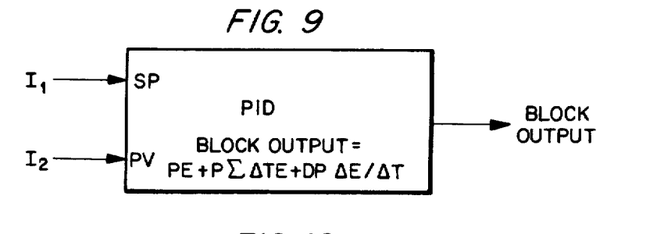
FIG. 9 is a schematic representation of an exemplary 'proportional/integral/differential' functional block.

Function designation: PID (FIG. 9)

This function symbol permits the system operator to select a block output that is a function of a proportional, an integral, and/or derivative function as follows:

$$\text{Block Output} = PE + P \Sigma \Delta TE + DP \frac{\Delta E}{\Delta T}$$

Figure 10:
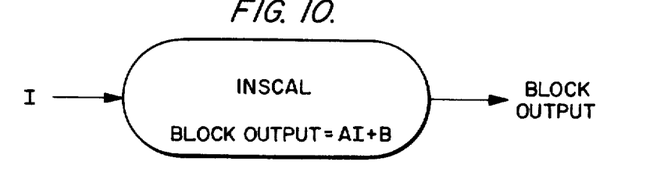
FIG. 10 is a schematic representation of an exemplary 'input scaling' functional block.

Where:
 E=(SP−PV) Normal Acting=(PV−SP) Reverse Acting
 SP − Set Point
 PV = Process Variable
 P = Proportional Gain Constant in Percent
 I = Integral constant in minutes/reset
 D = Derivative contant
 T = Sample Time Period Function designation: INSCAL (FIG. 10)

This function symbol permits the system operator to scale an input as follows:

$$\text{Block Output} = AI + B$$

Figure 11:
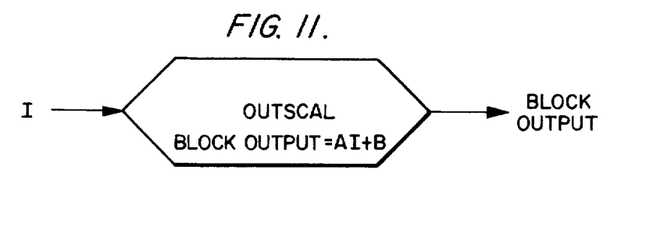
FIG. 11 is a schematic representation of an exemplary 'output scaling' functional block.

Where:
 I = Hardware input (e.g., 0–10 VDC, 4–20 ma, etc.)
 A = Multiply constant
 B = Offset Constant Function designation: OUTSCAL (FIG. 11)

This function symbol permits the system operator to scale an output as follows:

$$\text{Output} = AI + B$$

Figure 12:
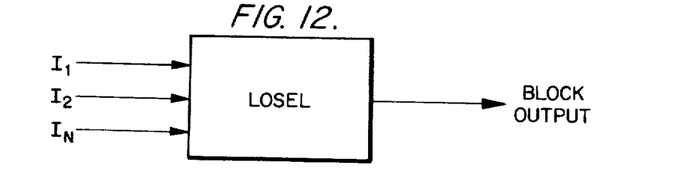
FIG. 12 is a schematic representation of an exemplary 'low input selector' functional block.

Where:
 I = Input Signal, Constant or Block
 A = Multiply Constant
 B = Offset Constant Function designation: LOSEL (FIG. 12)

This function symbol permits the system operator to select, as the output, the lowest of two more inputs to the symbol as follows:

| | |
|---|---|
| Block Output = $I_1$ | IF $I_1 < I_2$ |
| | AND $I_1 < I_3$ |
| | AND $I_1 < I_n$ |
| Block Output = $I_2$ | IF $I_2 < I_1$ |
| | AND $I_2 < I_3$ |
| | AND $I_2 < I_n$ |
| Block Output = $I_3$ | IF $I_3 < I_1$ |
| | AND $I_3 < I_2$ |
| | AND $I_3 < I_n$ |

Figure 13:
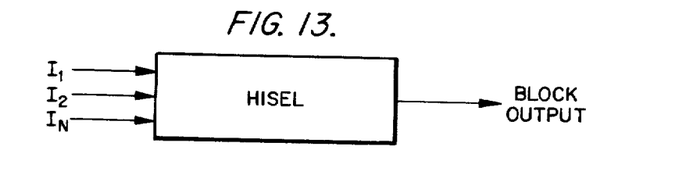
FIG. 13 is a schematic representation of an exemplary 'high signal selector' functional block.

Where:
 $I_1$ = First Input Signal to Block: constant or other block output
 $I_2$ = Second Input Signal to Block: constant or other block output
 $I_n$ = Third Input Signal to Block: constant or other block output Function designation: HISEL (FIG. 13)

This function symbol permits the system operator to select, as an output, the highest of two more inputs as follows:

| | |
|---|---|
| Block Output = $I_1$ | IF $I_1 > I_2$ |
| | AND $I_1 > I_3$ |
| | AND $I_1 > I_n$ |
| Block Output = $I_2$ | IF $I_2 > I_1$ |
| | AND $I_2 > I_3$ |
| | AND $I_2 > I_n$ |
| Block Output = $I_n$ | IF $I_n > I_1$ |
| | AND $I_n > I_2$ |
| | AND $I_n > I_3$ |

Figure 14:
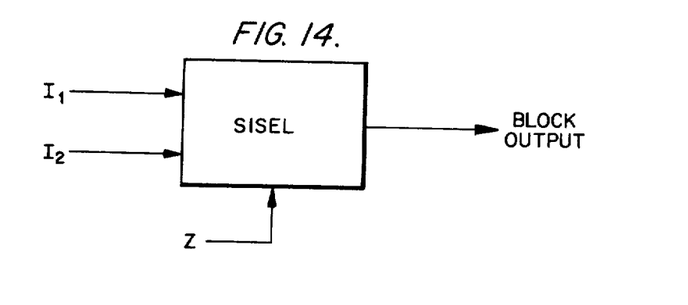
FIG. 14 is a schematic representation of an exemplary 'signal selector' block.

Where:
 $I_1$ = First Input Signal to Block: Constant or other block output
 $I_2$ = Second Input Signal to Block: Constant or other block output
 $I_3$ = Third Input Signal to Block: Constant or other block output Function designation: SISEL (FIG. 14)

This function symbol permits the system operator to select one of two input signals as follows:

Block Output = $I_1$ if Z is "on"

Block Output = $I_2$ if Z is "off"

Figure 15:
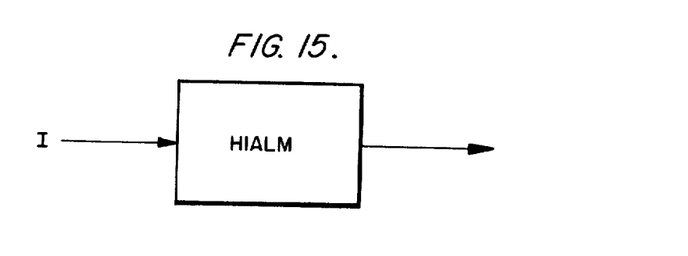
FIG. 15 is a schematic representation of an exemplary 'high alarm limit' functional block.

Where:
$I_1$ = First Input Signal to Block: constant or other block output
$I_2$ = Second Input Signal to Block: constant or other block output
Z = Signal select (digital)
Function designation: HIALM (FIG. 15)

This functional symbol permits the system operator to generate an alarm output if the input exceeds a selected value as follows:

Z = "ON" if I increasing > A + K

Z = "OFF" if I is decreasing < A − K

Figure 16:
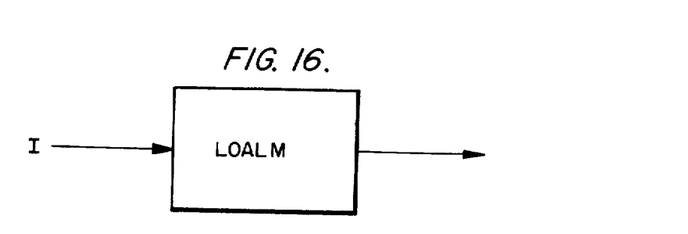
FIG. 16 is a schematic representation of an exemplary 'low alarm limit' functional block.

Where:
Z = Digital output
I = Input signal to block: constant or other block output
K = Dead band constant in percent of full scale
Function designation: LOALM (FIG. 16)

This function symbol permits the system operator to obtain a low alarm output when the input to the block falls below a preset value as follows:

Z = "ON" if I is decreasing < A + K

Z = "OFF" if I is increasing > A − K

Figure 17:
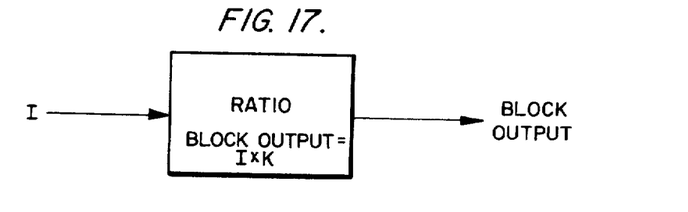
FIG. 17 is a schematic representation of an exemplary 'ratio' generating functional block.

Where:
Z = Digital output.
I = Input signal to block: constant or other block output
K = Dead band constant in percent of full scale
Function designation: RATIO (FIG. 17)

The function symbol permits the system operator to obtain an output that is the product of the input and a fixed value as follows:

Block Output = $I \times K$

Figure 18:
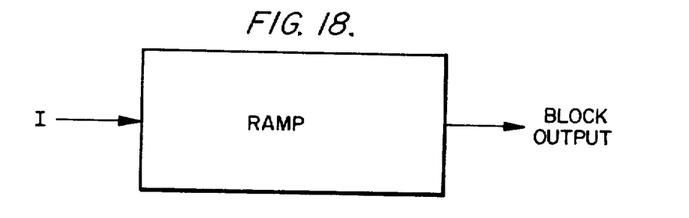
FIG. 18 is a schematic representation of an exemplary 'ramp' function generating block.

Where:
I = Input signal to block; constant or other block output
K = Constant
Function designation: RAMP (FIG. 18)

This function symbol permits the system operator to limit the rate of change of an input to form the block output as follows:

| | |
|---|---|
| Block Output = | I if (BV$_o$ − I) K T |
| Block Output = | BV$_o$ + K T if (BV$_o$ − 1) K T AND BV$_o$ − 1 is positive |
| Block output = | BV$_o$ − K T if (BV$_o$I) K T AND BV$_o$ − 1 is negative |

Figure 19:
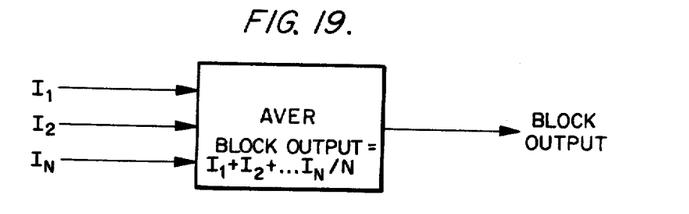
FIG. 19 is a schematic representation of an exemplary 'averaging' functional block.

Where:
I = Input to block: constant or other block output
BV$_o$ = Block output at last sample interval
K = Maximum rate of change-percent/second
Function designation: AVER (FIG. 19)

This function symbol permits the system operator to obtain the average of multiple inputs as its output as follows:

Block Output = $\dfrac{I_1 + I_2 + \ldots I_n}{n}$

Figure 20:
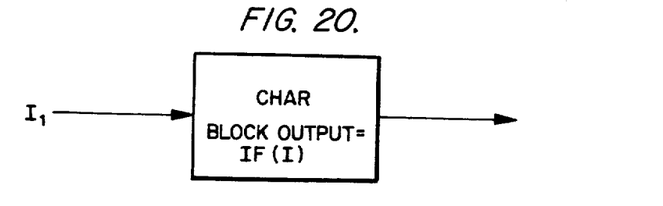
FIG. 20 is a schematic representation of an exemplary 'function characterizing' block.

Where:
$I_1$ = First input to block: constant or other block output
$I_2$ = Second input to block: constant or other block output
$I_n$ = Nth input to block: constant or other block output
Function designation: CHAR (FIG. 20)

This function symbol permits the system operator to provide a block output that is a non-linear function of its input as follows:

Block Output = $f_n(I)$

Figure 21:
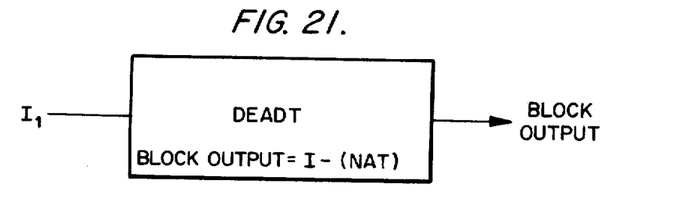
FIG. 21 is a schematic representation of an exemplary 'time delay' functional block.

Where:
I = Input to block: constant or other block output
$f_n(I)$ = Some function of I specified by the user at multiple discrete points. The curve fit will be a second order fit between the defined points.
Function designation: DEADT (FIG. 21)

Figure 22:
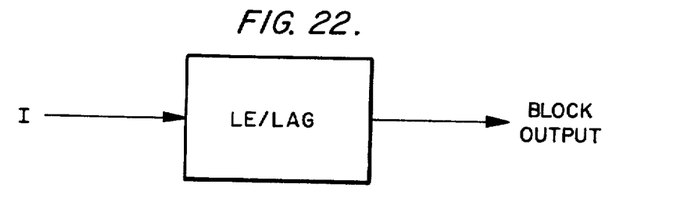
FIG. 22 is a schematic representation of an exemplary 'lead/lag' functional block.

This function symbol permits the system operator to delay the block input by an adjustable time delay as follows:
Block Output = $I - N\Delta T$
I = Input Signal constant or block
N = Number of sample periods the input signal is to be delayed
T = Sample time period
Function designation: LE/LAG (FIG. 22)

Figure 23:
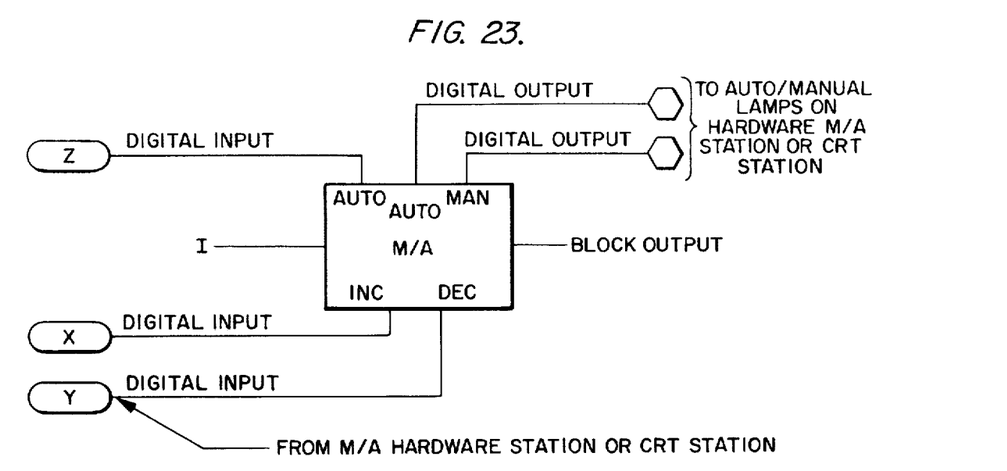
FIG. 23 is a schematic representation of an exemplary 'automatic/manual' control block.

This function symbol permits the system operator to provide a block output that dynamically compensates an input signal by responding gradually to input signals, that is, lagging, and/or by anticipating the input signal, that is, leading the signal as follows:

Block Output = $\dfrac{T_{LEAD} S + 1}{T_{LAG} S + 1} I$ $T_{LEAD}$ = Lead Time Constant
$T_{LAG}$ = Lag Time Constant
Function designation: MAN/AUTO (FIG. 23)

This function symbol permits the system operator to effect manual control as follows:

Block Output = $I$ if Z (auto) is "on"

Block Output = $BV + \dfrac{K - X}{-K - Y}$ if Z (auto) is "off"

Where:
I = Input Signal to Block: constant or other block output
Z = Digital Signal
BV = Block Variable
K = Rate of Increase/Decrease Constant
X = Increase Signal
Y = Decrease Signal The functional symbols described above permit the system operator to use the video output device 108a and the keyboard 104 (FIG. 3) to configure or reconfigure the operational architecture of the control system. This is accomplished when the operator, using the keyboard 104a, accesses the available function symbols by causing the function symbol interrogatories shown in FIG. 24 to be displayed. By assigning different types of block identifiers and inserting input identifiers, it is possible to sequentially configure a control system arrangement as shown, for example, in FIG. 25 for effecting operation of the coal feeder arrangement of FIG. 2.

Figure 24:
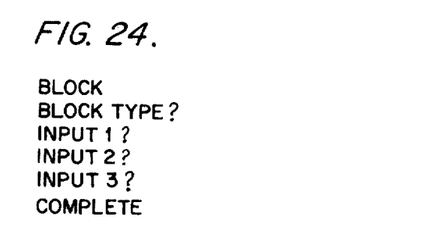
FIG. 24 is an exemplary set of block interrogatories.
Figure 24A:
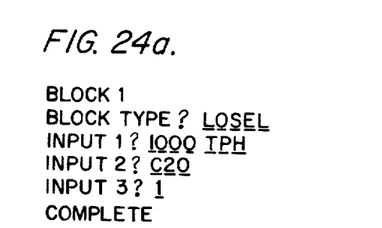
FIG. 24A is the exemplary interrogatories of FIG. 24 with exemplary information.
Figure 25:
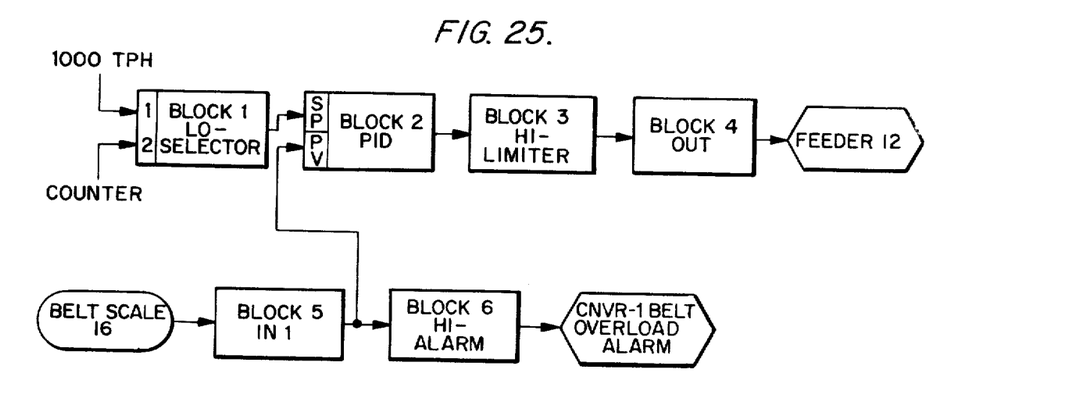
FIG. 25 is an exemplary control system architecture adapted to effect control of the crushed-coal feeder of FIG. 2.

In order to configure the control system arrangement shown in FIG. 25, the system operator calls up the logic and system parameter query display shown in FIG. 24. Thereafter, the system operator will develop the block functional diagram by designating the appropriate types of blocks and inputs thereof as follows:

| BLOCK? | 1 |
|---|---|
| BLOCK TYPE? | LOSEL |
| INPUT 1? | 1000 TPH |
| INPUT 2? | COUNT |
| INPUT 3? | NONE |
| COMPLETE | |

In setting up the first functional block of the crushed-coal feeder control (architecture shown in FIG. 25,) the system operator identifies the first block as block 1, specifies the so-identified block as a LOSEL (low input selector) block, specifies a first input as 1000 TPH (tons per hour), and specifies a second input as a counter input from a counter (not shown). The LOSEL block will select the lower of its two inputs. When the counter input is above 1000 TPH, the LOSEL block will always select the 1000 TPH value. On the other hand, when the counter input is below 1000 TPH, the LOSEL block will select the lower counter input. In this way, control of the crushed coal feed rate set point between zero and 1000 tons per hour can be readily achieved. The second functional block is established as follows:

| BLOCK 2 | |
|---|---|
| BLOCK TYPE? | PID |
| INPUT 1? | BLOCK 1 |
| INPUT 2? | BLOCK 5 |
| INPUT 3? | NONE |
| COMPLETE | |

In setting up the second functional block, the system operator identifies the block as block 2, specifies the so-identified block as a PID (proportional, integral, differential) functional block, specifies the first input (the set point SP input) as the output of block 1, specifies the second input (parameter variable PV) as the output of block 5 (discussed below). The third block is configured as follows:

| BLOCK 3 | |
|---|---|
| BLOCK TYPE? | HILIM |
| INPUT 1? | BLOCK 2 |
| INPUT 2? | NONE |
| INPUT 3? | NONE |
| COMPLETE | |

In setting up the third block, the system operator identifies the block as a HILIM (high input limit) with the only input of the high limit block indicated as the output of block 2. The high limit block prevents flow rates greater than the preselected limit which limit is established as indicated in further detail below. The fourth block is configured as follows:

| BLOCK 4 | |
|---|---|
| BLOCK TYPE? | OUTSCAL |
| INPUT 1? | BLOCK 3 |
| INPUT 2? | NONE |
| INPUT 3? | NONE |
| COMPLETE | |

In setting up the fourth functional block, the system operator identifies the block as block 4, specifies the so-identified block as an OUTSCAL block, and identifies its only input as the output of block 3. The OUTSCAL block scales the output of the high limit block and then provides its output to the feeder 12 (FIG. 2). The fifth block is established as follows:

| BLOCK 5 | |
|---|---|
| BLOCK TYPE? | INSCAL |
| INPUT 1? | BELT SCALE |
| INPUT 2? | NONE |
| INPUT 3? | NONE |
| COMPLETE | |

In setting up the fifth functional block, the system operator identifies the block as block 5, specifies the block as an INSCAL block (input scaling), identifies the only input to the INSCAL block as the belt scale 16 output (FIG. 2). Block 5 thus scales the electrical output for use with the PID functional block, block 2. The sixth block is configured as follows:

| BLOCK 6 | |
|---|---|
| BLOCK TYPE? | HIALM |
| INPUT 1? | BLOCK 1 |
| INPUT 2? | NONE |
| INPUT 3? | NONE |
| COMPLETE | |

In setting up the sixth functional block, the system operator identifies the block as block 6, specifies that it is a HIALM block, (high alarm limit) and identifies its input as block 1. The output of the high alarm block 6 is directed to a conveyor belt overload enunciator.

As can be appreciated from the above, by using the query display shown in FIG. 24 as illustrated above, it is possible for the system user to conveniently configure or reconfigure control architecture.

Additional functional control of the system of FIG. 2 may be achieved by an assembly language arrangement also accessible from the user system supervisor S.

A suitable assembly language program is shown below.

IF AND IFO

IF and IFO are used to interrogate the "ON" OR "OFF" status of an input device, output device, timer, or flag. If the status matches that of the instruction, the logic controller skips the instruction following the IF instruction and executes the next instruction. If the status does not match, the controller executes the instruction following the IF instruction.

| IF | Input Device # | ON | If operating status of |
|---|---|---|---|
| | Output Device # | | interrogated device is OFF, |

-continued

| | | | |
|---|---|---|---|
| Flag #<br>Timer # | | | execute next successive instruction. |
| | | OFF | If operating state of interrogated device is ON, skip next successive instruction and execute second successive instruction. |
| IFO Device # | | ON | If operating state of interrogated device is ON, skip next successive instruction and execute second successive instruction. |
| | | OFF | If operating status of interrogated device is OFF, execute next successive instruction. |

OUT AND OUT SKIP

OUT is always used to turn an output device, timer or flag "ON" or "OFF". OUT SKIP is the same as OUT but the controller skips the first instruction following the OUT SKIP instruction and executes the second instruction.

| | | | |
|---|---|---|---|
| OUT | Device #<br>Timer #<br>Flag # | ON<br><br>OFF | Turn designated device ON<br>Turn designated device OFF |
| OUT SKIP | Device #<br>Timer # | ON<br><br><br><br>OFF | Turn designated device ON, skip next successive instruction and execute second successive instruction.<br>Turn designated device OFF, skip next successive instruction and execute second successive instruction. |

JUMP

Jump causes the controller to resume operation at the specified statement number.

| | | |
|---|---|---|
| JUMP | Statement # | Jump to and resume operation at designated statement |

NOOP

NOOP indication no operation for the statement.

| | |
|---|---|
| NOOP | No operation |

GOTO and GOBK and GOBK+

GOTO is used to jump to a subroutine and causes the controller to store the number of the statement following the GOTO instruction for use by GOBK instruction. GOBK is used at the end of a subroutine to resume execution at the statement number stored by the associated GOTO instruction. GOBK+ is used at the end of a subroutine to resume execution at the statement number stored by associated GOTO instruction plus the specified displacement number.

| | | |
|---|---|---|
| GOTO | Statement # | Jump to designated |

-continued

| | | |
|---|---|---|
| | | statement (e.g., subroutine), store statement # of statement following GOTO statement for subsequent return thereto. |
| GOBK | Statement # | Jump back to statement # stored by previously executed GOTO statement. |
| GOBK+ | Displacement # | Jump to statement # statement # stored by previously executed GOTO statement plus supplied displacement. |

TST

TST is used to test the "ON" or "OFF" status of a designated input device, output device, timer or flag. The result of the TEST is used to set the conditions for the and and/or instructions.

| | | | |
|---|---|---|---|
| TST | Device #<br>Timer #<br>Flag # | ON<br><br>OFF | Set appropriate status on (true).<br>Set appropriate status off (not true). |

AND or OR

AND is used to test the "ON" or "OFF" status of the 'AND' condition. The 'AND' condition is considered to "ON" if the results of all the immediately preceding TST instructions were true. If the status matches that of the instruction, the logic controller skips the instruction following the TST instruction and executes the next instruction. If the status does not match, the controller executes the instruction following the AND instruction.

OR is used to test the "ON" or "OFF" status of the 'OR' condition. The 'OR' condition is considered to be "ON" if the result of at least one the the immediately preceding TST instructions was true. Skip conditions are the same as AND.

| | | |
|---|---|---|
| AND | ON | Set if immediately preceding TST instructions is true. |
| | OFF | Set if immediately preceding TST instruction is untrue. |
| OR | ON | Set if any one of immediately preceding TST instruction is untrue. |
| | OFF | |

PLS and PLS SKIP

PLS is used to pulse an output device "ON" for a short period of time. The pulse period is adjustable from 200 MSEC to 1.5 seconds.

PLS SKIP is the same as PLS but the controller skips the instruction following PLS SKIP insatruction.

| | | |
|---|---|---|
| PLS | Device # | Pulse designated device "ON" for select pulse duration |
| PLS SKIP | Device # | Pulse designated device |

FLS and FLS SKIP

FLS is used to flash an output "ON" and "OFF" at the rate of 1 cycle a second.

FLS SKIP is the same as FLS but the controller skips the instrction following the FLS SKIP instruction.

| FLS | Device # | Flash designated output device on and off at 1 sec. repetition rate. |
|---|---|---|
| FLS SKIP | Device # | Flash designated output device on and off at 1 sec. Repetition rate, skip next successive instruction and resume at second successive instruction |

SET1

SET1 is used to set the specified counter to one.

| SET1 | Counter # | Set specified counter to one. |
|---|---|---|

MSG

MSG is used to print stored messages (identified by designated number) on a teletype, printer, or CRT.

| MSG | Number | ON | enable printer and print designated message. |
|---|---|---|---|
| | | OFF | Turn printer off. |

EXIT

EXIT is used to transfer to machine laguage subroutines.

| EXIT | Number | | Transfer machine control to designated machine language subroutine. |
|---|---|---|---|
| COMP SKIP | Counter # | GT Counter # | compare first counter against second designated counter # for greater than inequality, skip next successive statement and resume at second successive statement. |
| | | EQ. Counter # | compare first designated counter against second designated counter for equality; skip next successive statement and resume at second successive statement. |
| | | LT. Counter # | compare first designated counter against second designated counter # for less than inequality, skip next successive statement and resume at second successive statement. |

INC

INC is used to increment the specfied counter by one.

| INC | Counter # | Increment specified counter by one. |
|---|---|---|

DEC

DEC is used to decrement the specified counter by one.

| DEC | Counter # | decrement specified counter by one. |
|---|---|---|

SETZ

SETZ is used to set the specified counter to zero.

| SETZ | Counter # | set specified counter to one. |
|---|---|---|

COMP and COMP SKIP

COMP tests the specified counter for greater than, equal to, or less than the specified number or counter. The skip conditions are the same as for the IF instructions.

| COMP | Counter # | GT Counter # | compare first designated counter # with second designated counter for greater than inequality. |
|---|---|---|---|
| | | EQ Counter # | compare first designated counter against second designated counter # for equality. |
| | | LT Counter # | compare first designated counter against second designated counter # for less than inequality. |

Figure 26:
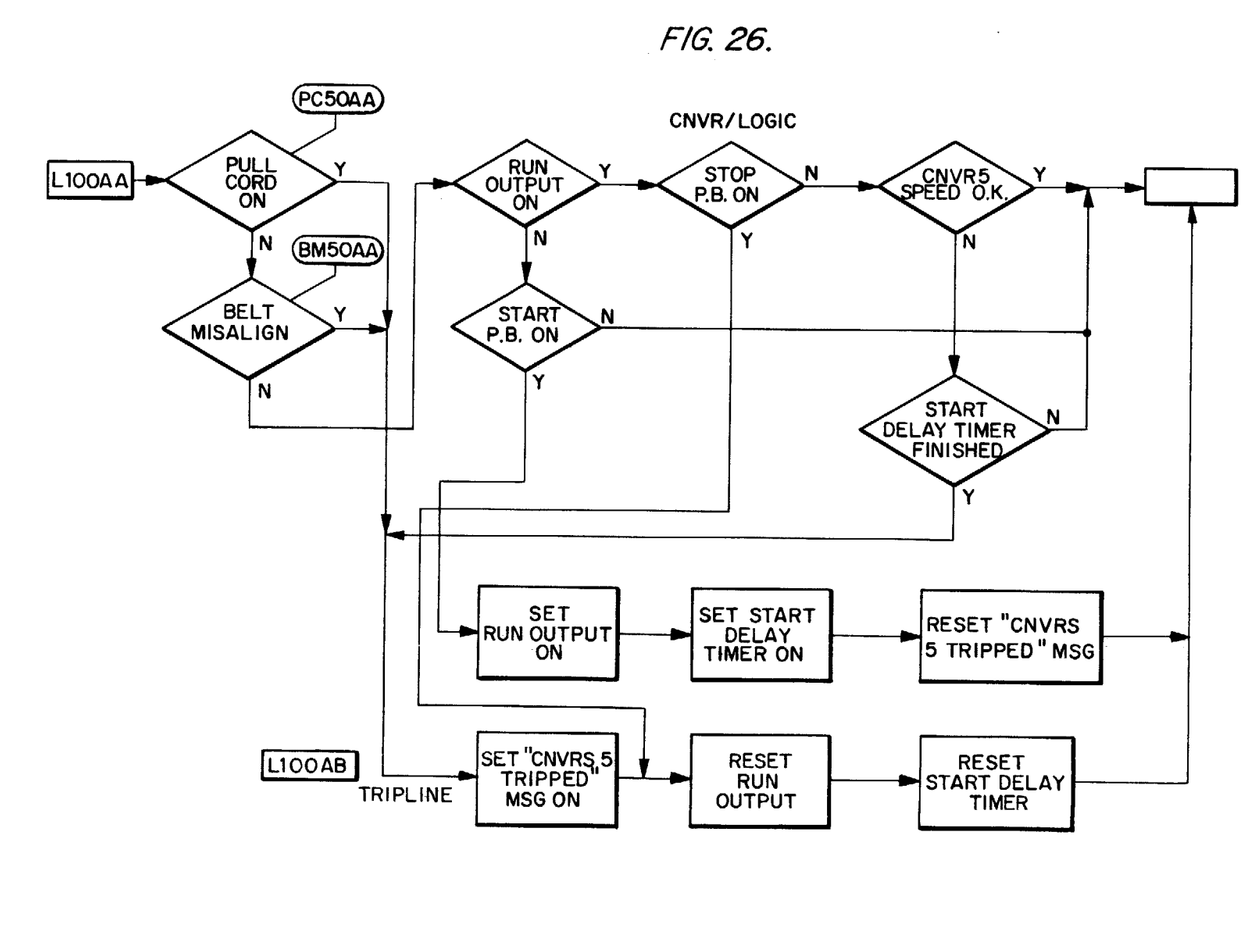
FIG. 26 is an exemplary flow diagram for effecting control of the crushed-coal feeder of FIG. 2.

The exemplary alphanumeric control instructions explained above permits the system operator a considerable degree of flexibility in establishing functional control over a particular system including, for example, the system shown in FIG. 2. In the case of the crushed-coal feeder shown in FIG. 2, an exemplary control flow diagram for control thereof is shown in FIG. 26 and may be readily implemented using the control instructions set fourth above. As can be seen from an inspection of FIG. 26, various decision blocks are provided by the IF-type control instruction to establish pre-start logic for the conveyor 14 including an IF query for the conveyor pull cord (not shown) status and a IF query for the conveyor belt alignment as well as other queries relating to the status of a 'run output' register, the start and stop push buttons, a conveyor speed transducer, and a delay timer. Depending upon the output of the various inter-related IF queries, execution blocks shown in the lower part of FIG. 26 are provided to set or reset various registers and/or timers and provide an appropriate message on the video output device 108a which preferably takes the form of a CRT screen. A partial instruction listing that demonstrates the effecting of the flow diagram of FIG. 26 is provided below, a full listing not being necessary to provide an understanding of the exemplary instruction set.

LISTING

| Statement # | Label # | Op-code | Operand | Comment |
|---|---|---|---|---|
| 100 | L100AA | IF | Device (Pull Cord) PC50AA 'OFF' | Pull Cord on/off? |
| 101 | | JUMP | L100AB | |
| 102 | | IF | Device (Belt Misalign) 'OFF' | Belt aligned? |
| 103 | | JUMP | L100AB | |
| 104 | | IFO | Device (Start output) 'ON' | Start Output On? |
| 105 | | JUMP | L100AC | |

The instruction listings are typically constructed by the system operator using the keyboard 104a and the video display unit 108a (FIG. 3) by entering the control function instruction desired and providing appropriate device 'tags' or identifiers (e.g. PC50AA). Changes to the listing are accomplished by calling up the to-be-changed listing by either statement number or by label number. Thereafter a cursor displayed on the video output unit 108a is moved by appropriate entry at the keyboard 104a over the area to be changed and the new information overtyped using the appropriate keys to effect the desired change.

As can be appreciated from the above, a system operator, while using the keyboard 104a or the system supervisor and interacting with the video output device 108a can select a graphically displayed symbolic control function operator (as in FIGS. 4-23) and/or the instruction set functional operators listed above for constructing control architectures for a control system.

As can be readily appreciated by those skilled in the art, various changes and modifications can be made to the invention described above without departing from the spirit and scope thereof as defined in the appended claims and their legal equivalent.

What is claimed is:

1. A control system for effecting control over an industrial process, said control system comprising:
   a plurality of remotely located process controllers interconnected to one another through a common communications link, some of said controllers each connected to at least one controlled device for effecting control thereover, some of said controllers each connected to at least one sensor for receiving sensed information therefrom;
   a control system supervisory unit connected to said communications link, said system supervisory unit transmitting and receiving information in coded form to and from said remotely located controllers to effect control over the industrial process;
   said system supervisory unit including means for interacting with a system operator including information entry means and information display means;
   said system supervisory unit including data processing means containing instruction sets to define a plurality of functional blocks, each block capable of receiving one or more input values, operable to perform a different function on the input values, and produce an output value determined by the input values and the function performed thereon, said data processing means containing instruction sets to define a plurality of process controlling program steps of an assembly language program, said data entry means operable to apply information signals of a first set to said data processing means specifying selected ones of said functional blocks and specifying the source of the input values to the selected functional blocks to thereby determine a first control system architecture for said remotely located controllers, said data entry means being operable to apply information signals of a second set to said data processing means to select a sequence of said program steps and parameters for said program steps to define a second control system architecture for said remotely located controllers, said data processing means being operable to cause said display means to display information indicating what selections with respect to said functional blocks are to be made and have been made by the information signals of said first set and to display information indicating the selections with respect to said program steps to be made and that have been made by the information signals of said second set,
   said control system including means to effect control over said industrial process in accordance with said first and second control system architecture determined by the information signals generated by said data entry means.

2. The control system claimed in claim 1 wherein: said information entry means includes operator accessible keyboard.

3. The control system claimed in claim 1 wherein: said information display means includes CRT display means for displaying the graphic symbolic and alphanumeric functional operators.

4. A method for effecting control over an industrial process, the control system of the type having a plurality of remotely located controllers interconnected through a common inter-communications link, some of said controllers each connected to at least one controlled device for effecting control thereover and some of said controllers each connected to at least one sensor for receiving sensed information therefrom and a system supervisor unit connected to said communications link for transmitting information to and receiving information in coded form from said controllers, said system supervisor including means for displaying information to a system operator and means for inputting information into said system and memory means containing process control function information, said method comprising the steps of:
   providing process control information in said memory means to define functional blocks each designed to receive one or more input values, performing a different function on the input values, and producing an output value determined by the input value and the function performed thereon;

providing process control information in said memory means to define a plurality of process controlling program steps of an assembly language program;

specifying selected ones of said functional blocks and the source of the input values for the selected blocks from said input means to configure a first control system architecture;

selecting a sequence of said program steps and the parameters therefor from said information input means to define a second control system architecture;

displaying said first and second control system architecture on said display means; and implementing said first and second control system architecture through said system supervisor unit to effect coordinated control over the remotely located controllers in accordance with said control system architecture.

5. The method claimed in claim 4 wherein said first and second manipulating steps are effected through a system user assessible keyboard.

* * * * *